June 29, 1926.

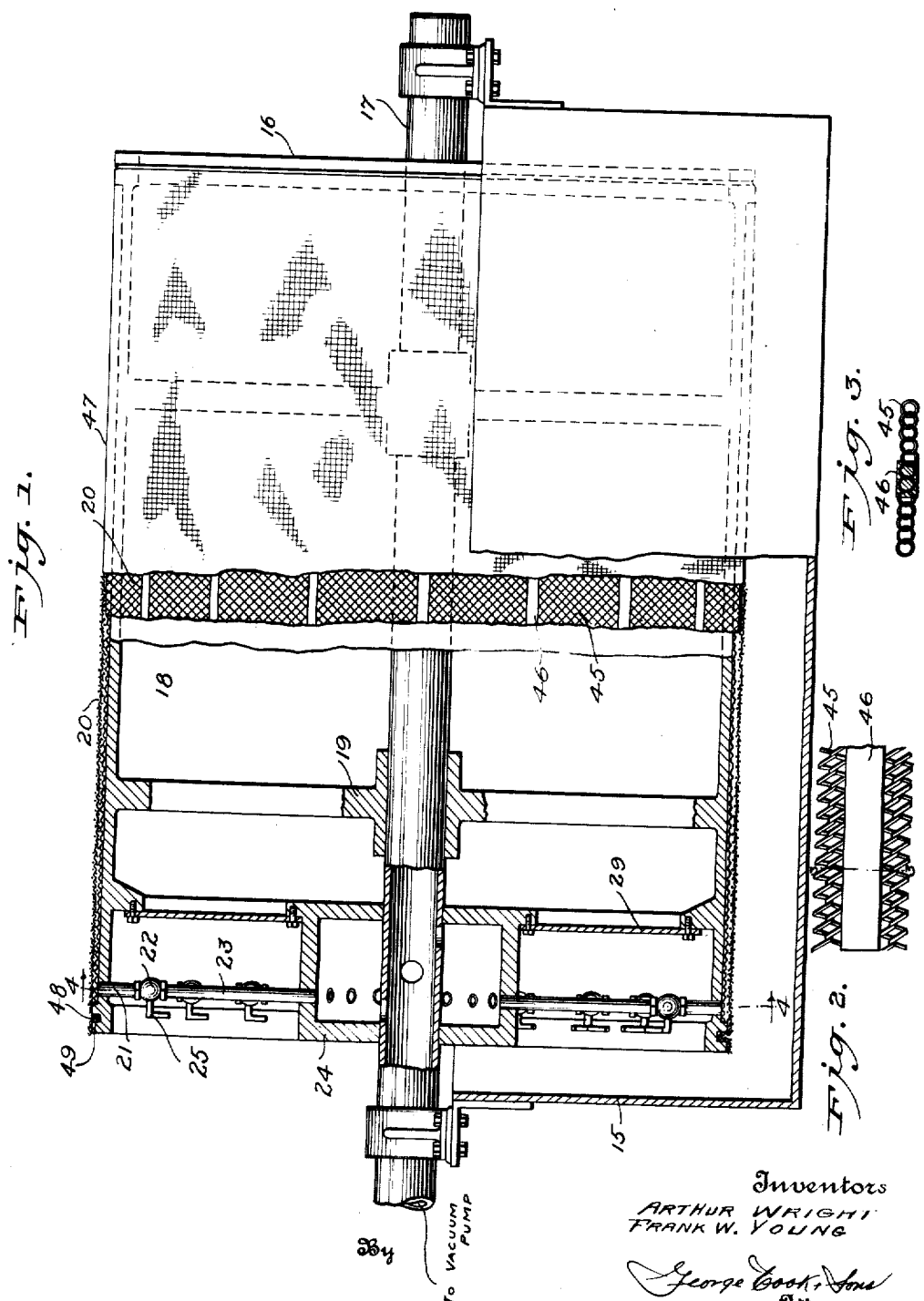

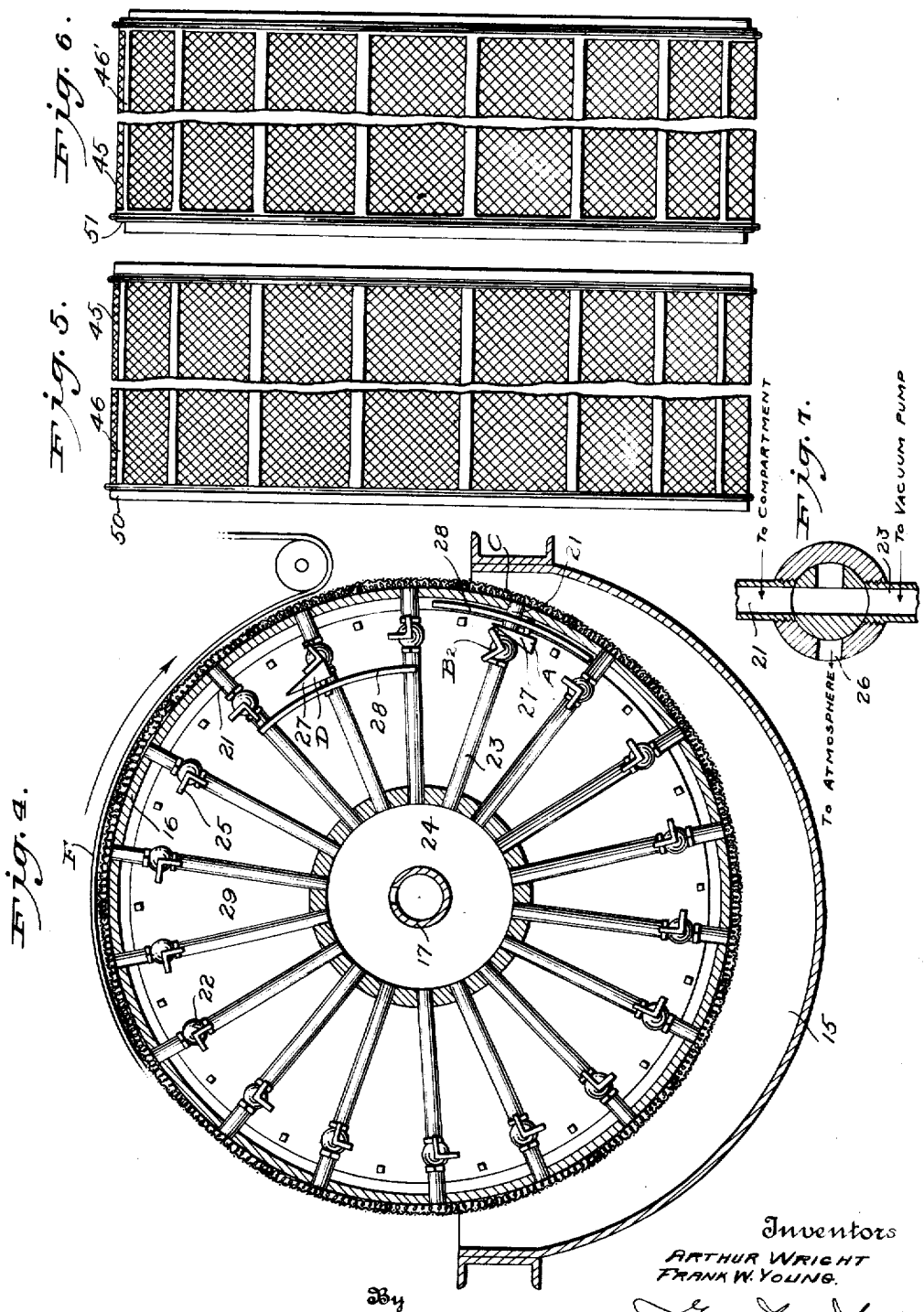

A. WRIGHT ET AL 1,590,401

ROTARY DRUM FILTER

Filed Nov. 16, 1921   3 Sheets-Sheet 3

Inventors
ARTHUR WRIGHT
FRANK W. YOUNG

By George Cook & True
Attorneys

Patented June 29, 1926.

1,590,401

UNITED STATES PATENT OFFICE.

ARTHUR WRIGHT, OF UPPER MONTCLAIR, AND FRANK W. YOUNG, OF VERONA, NEW JERSEY.

ROTARY-DRUM FILTER.

Application filed November 16, 1921. Serial No. 515,434.

Our invention relates to a rotary drum filter.

It has been found that with our novel filter cake compressor such as described in our co-pending application, Ser. No. 499,753, filed Sept. 10, 1921, the use of reversed compressed air is unnecessary in order to discharge the filter cake, and it is accordingly an object of the present invention to provide a filter wherein advantage is taken of the elimination of the reversed compressed air and a simplified form of valve arrangement provided, which valve arrangement is simple in construction and positive in operation, as well as ecconomical to construct, and is adapted to bring the separate compartments of the filter drum successively into communication with a source of low pressure or vacuum and with the atmosphere.

A further object is to provide a rotary drum filter adapted to operate without the use of reversed compressed air and having a light fabric for a filtering medium, so that a high capacity for each square foot of filter surface is obtained. Further, to eliminate the usual wire winding on the drum, so that the filter cloth may be easily renewed.

A further object is to provide a rotary drum filter wherein the amount of excess unfiltered liquid in the tank is reduced to a minimum and the agitation of the same accordingly increased to a maximum, so that the filtration of the liquid may be efficiently carried out.

A further object is to provide a rotary drum filter wherein each compartment is provided with two separately controlled outlet pipes, so that the filtration taking place in any compartment may be divided into two phases or steps and the initial and final filtrate handled separately.

A further object is to provide a rotary drum filter wherein each compartment will during a single rotation of the drum be subjected to the action of two suction pressures, the initial pressure being applied through one outlet pipe leading from the compartment during the time the drum is immersed and during which period the filtration is takirg place, and to a second and somewhat higher or more intense suction pressure so as to forcibly draw air through the cake during the time the particular compartment in question is free or above the liquid.

A further object is to provide a rotary drum filter having an improved form of screen or drainage member and having an improved form of partitions for the separation or formation of the various compartments.

A further object is to accomplish the aforementioned ends in a simple and expeditious manner and to provide a filter which may be easily and economically made, embodying a minimum number of parts so designed as to be readily accessible at all times for repairs, and at the same time capable of performing efficient and satisfactory service with a minimum amount of upkeep, and with the foregoing and other objects in view our invention consists in the improved rotary-drum filter illustrated in the accompanying drawings and hereinafter described and claimed, and in such variations and modifications thereof as will be obvious to those skilled in the art to which our invention relates, it being understood that changes may be made within the scope of wnat is claimed wthout departing from the spirit of the invention.

In the accompanying drawings:

Figure 1 is a view in front elevation and partially in section of our improved rotary drum filter;

Figure 2 is a detail view in front elevation of a portion of the drainage member for the compartments;

Figure 3 is a sectional view of the same taken on the line 3—3 of Figure 2;

Figure 4 is a view in end elevation and partially in section of our improved filter;

Figure 5 is a detail view of a somewhat modified form of rotary drum;

Figure 6 is a somewhat further modification of the same;

Figure 7 is a detail view in section of one of the valves controlling the compartments of the filter drum;

Figure 8:
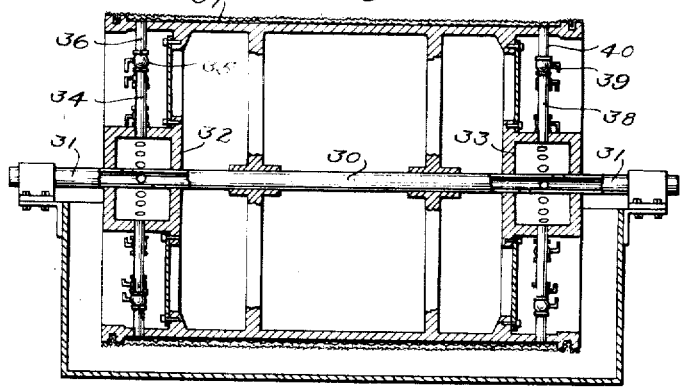
Figure 8 is a view in elevation of our improved rotary filter having a double set of outlet pipes and controlling valves communicating with each compartment.

Referring specifically to the several views, wherein similar reference numerals designate corresponding parts throughout, our improved filter includes the usual tank 15 and in which is partially immersed the rotary drum 16, the same being carried on the hollow shaft 17. The drum is formed with the solid periphery 18 carried on the usual spokes or spiders 19 which in turn are supported by the shaft 17. The external surface of the drum is formed with a number of filtering compartments 20, as will be more fully hereinafter described, and with each of which compartments communicates an outlet pipe 21. Each outlet pipe 21 carries a two-way cock or valve 22, and by which term we refer to a valve wherein the fluid which is passing therethrough may be distributed to either of two branches or be entirely shut off therefrom. Thus the two-way cock or valve may bring each compartment into communication with pipes 23, which in turn communicates with a common manifold 24 and the interior of the hollow shaft 17. The hollow shaft is provided with the usual swivel joint (not shown) so that a low pressure or vacuum may be maintained within the hollow shaft and manifold 24 and which during certain phases of rotation of the drum will be communicated to the various compartments 20.

The two-way cock or valve 22 as disclosed in Fig. 7 is adapted to bring the outlet pipe 21 of the compartment into communication with the low pressure or vacuum pipe 23, or upon the turning or partial turning of the valve lever 25 to bring the outlet pipe 21 of the compartment into communication with the atmosphere through the valve opening 26. In order to automatically control the position of the valves, each handle 25 is formed L-shape and is adapted to contact with and be turned by suitable stationary cams or abutment blocks 27. These stationary cams are carried by the slotted frames 28, whereby they may be adjusted so as to properly time the opening and closing of the valves. Referring particularly to Figure 4, the cam marked "A" is about to turn the lever of the particular valve marked "B²", so that the compartment C will be brought into communication with the manifold 24 through the pipes 21 and 23 and a filter cake will be deposited on the filtering medium. After the compartment C has passed above the level of the liquid and out of the tank, air will be drawn through the filter cake for the drying thereof, which action will take place until the cam D is reached, whereupon the valve will be turned into its second position and the compartment C brought into communication with the atmosphere and which allows the filter cake to be readily stripped from the filtering medium.

As previously mentioned, our improved filter drum is particularly adapted for use in connection with our filter cake compressor, a portion of the compressor belt being shown at F in Figure 4, although the details of the compressor have been omitted.

The provision of individual valves controlling each compartment not only materially simplifies the filter construction, but renders each valve readily accessible for repair or renewal, and, further, allows for the adjustment of the relative portion of a revolution during which the valve is in its various positions, so that, for example, the valves may be timed so as to release the vacuum and open the compartments to the atmosphere prior to the time the endless belt of the compresser is led away from the drum so that the cake will accompany the compressor belt, or it may be timed so as to maintain the vacuum on the compartment until after the compressor belt has been led away from the rotary drum, and in which case the cake will not accompany the compressor belt. The ends of the drum are closed by the plates 29, so that there will be a minimum amount of unfiltered liquid within the tank 15 and there will accordingly be a maximum amount of agitation of this liquid, and which agitation it has been found materially increases and facilitates the filtration action.

In some instances we have found it desirable to provide each end of the drum with separate and distinct outlet pipes and controlling valves such as illustrated in the filter drum shown in Fig. 8, and referring particularly to this figure, the shaft 30 is provided with the hollow ends 31, each communicating with a separate source of low pressure or vacuum through suitable swivel joints (not shown) and which hollow ends communicate with the manifold 32 and manifold 33. Leading into the manifold 32 are the inlet pipes 34 controlled by the straight-way cock or valve 35 which in turn communicates with the outlet pipe 36 of the compartments 37. At the opposite end of the filter drum are the inlet pipes 38 communicating with the manifold 33 and controlled by the two-way cocks 39 which are similar to the valve illustrated in Fig. 7 and communicating with which valves are the compartment outlet pipes 40, the same communicating with the same compartments as the outlet pipes 36, so that leading from each compartment 37 are two outlet pipes 36 and 40, in turn controlled by the straight-way cock or valve 35 and the two-way cock 39. Suitable cams are provided for controlling the said valves and are similar to the cams A and D shown in Figure 4 with the exception that the cams for controlling the valve 39 are adapted to move the valve into three positions, the three positions of the valve being attained by impingement of the handle 25 thereof upon three cams that may be adjustably fixed cams like those shown in Fig. 4. Two of these cams act respectively to bring the valve shown in Fig. 7 into positions 90° apart; and a third cam is adjusted to give the valve a partial turn and set it in a position half way between the positions determined by the other two cams and thus close the valve against all flow. Of the three positions into which the valve is brought, one brings the compartments 37 into communication with the manifold 33, another brings the compartment 37 into communication with the atmosphere, and the third closes the pipe 40 to all fluid communication.

Figure 9:
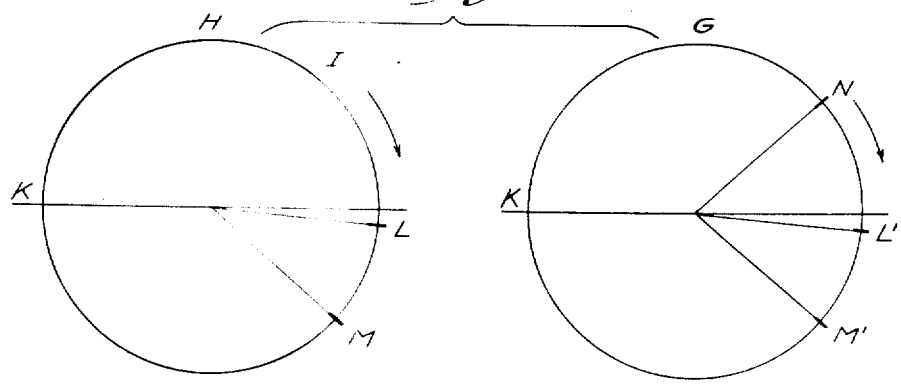
Figure 9 is a diagrammatic view illustrating the operation of the valves at the two ends of the filter drum whereby the initial filtrate may be kept separate from the final filtrate.

With the filter drum as thus constructed, it may be operated in several ways, as, for example, when it is desired to keep the initial filtrate separate from the final filtrate, due to the tendency of the initial filtrate to contain considerable solids, caused by the clean condition of the filter cloth as it enters the liquors, the valves are operated as shown in the valve diagrams, Fig. 9. Referring to the valve diagrams, H represents the action of the straight-way valve 35 and diagram G the operation of the two-way cock 39. The circle I represents the path of travel of a compartment or valve, and the line K the top surface of the liquid to be filtered. By a suitable cam arrangement similar to that previously described, the valve 35 is opened at the line marked L and closed at the line marked M, the minor arc L—M representing the period during which the initial filtration takes place through the valve 35, and the major arc M—L represents the period during which the valve 35 is closed. The operation of the two-way cock 39 at the opposite end of the drum, as shown in diagram G, is as follows:

A suitable cam (not shown) opens the two-way valve so as to bring the compartment into communication with the source of low pressure within the drum at the line M', corresponding in position to the line M of the diagram H. The valve remains in such position until it reaches the line N and during which time the final filtration and drying of the cake takes place. At the line N the valve is moved by a suitable cam (not shown), causing the particular compartment in question to be brought into communication with the atmosphere, so that the filter cake may be readily stripped from the filtering medium. The two-way cock 39 will then be brought into a neutral position at the line L', corresponding to the line L of the previous diagram, so that the initial filtrate will pass to the manifold 32 and the final filtrate to the manifold 33.

Figure 10:
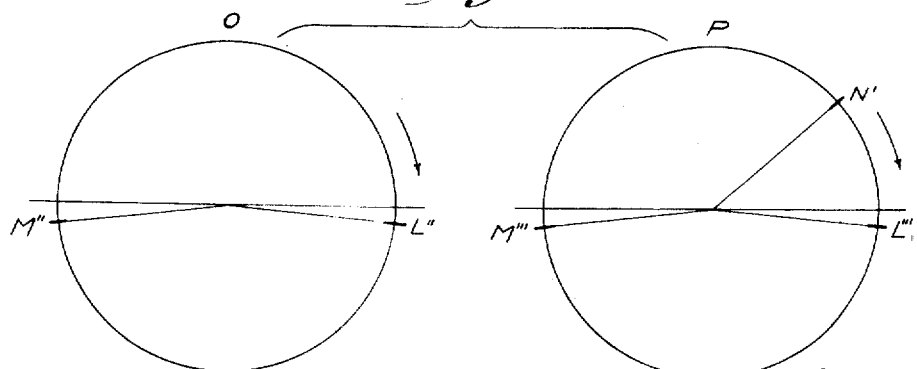
Figure 10 is a diagrammatic view illustrating the operation of the valves at the two ends of the filter drum, whereby the wash water may be kept separate from the filtrate or each compartment of the drum may be subjected to a low pressure for filtration and a high vacuum pressure for the air drying of the filter cake.

It is obvious that we may operate our filter drum having separately controlled outlet pipes for each compartment in other ways, and a second example is shown in Figure 10, wherein it is desired to either handle the wash water separately or to subject each compartment to two different intensities of vacuum, that is to say, a low vacuum during the time the compartment is immersed in the liquid and filtration is taking place, and a second or more intense or higher vacuum after the compartment has passed above the liquid and drying air is being drawn through the filter cake. With this in view, the valves are operated as per the valve diagrams illustrated in Figure 10, the valve diagram O showing the operation of the single-way valve 35 and arranged to open at the line L" and close at the line M", during which time the filtration of the liquid takes place. The valve diagram P shows the operation of the two-way valve, each valve opening to the vacuum manifold 33 at the line M''', bringing the compartments into communication with the atmosphere at the line N' and closing to a neutral position at the line L''', so that during the period a compartment passes from L" and L''' to M" and M''' the straight-way cock or valve 35 is open and the valve 39 in neutral or closed position. During the time the compartment rotates from the line M" and M''' to N', the straight-way valve 35 is closed and the two-way cock 39 is open to a more intense or higher vacuum than that controlled by the valve 35, so that drying air will be forcibly drawn therethrough or the wash water may be handled separately from the filtrate. At N' the two-way cock opens to the atmosphere, allowing the filter cake to be stripped from the filtering medium, the straight-way cock remaining closed until the line L" and L''' is again reached, whereupon the cycle is repeated.

The ordinary filter drum is provided with drainage members formed of wood in the various compartments and which are a constant source of trouble, as well as expensive to produce. We have therefore provided our improved filter drum with what we term the spiral wire drainage member 45, as illustrated in detail in Figures 1, 2 and 3. This spiral wire is provided with the solid partitions 46, preferably formed of rubber, soft lead, bakelite, or similar substances, and which when drawn tight upon the periphery of the drum forms an air seal therefor and so divides the drum into the filter compartments with which the outlet pipes previously mentioned communicate. The filter cloth or filtering medium 47 is then wrapped around the spiral drainage members and the longitudinally extending partition members 46 and bound in place by the binding wires 48 which extend into the grooves 49 provided therefor at the ends of the filter drum. The elimination of the reversed compressed air as heretofore used and as previously explained, prevents the outward bulging of the filter cloth 47, so that the use of binding wires other than at the ends of the drum is accordingly unnecessary. Particular attention is called to the very efficient form of the drainage member which is produced by making the same of what is termed "spiral wire". By referring to Figure 2 it will be apparent that the spiral wire forms longitudinally extending ducts due to the angularity of the spirals of the wire, and also transversely extending ducts, as illustrated in Figure 2. Furthermore, the spiral wire has the loops of the spiral intertwined so as to form a complete and integral drainage member, and while we have disclosed the spiral or looped wire drainage member as being provided with solid partitions 46 embedded therein, it will be readily appreciated that the drum may be provided with either wood or iron partitions or spacers and the spiral or looped intertwined wire drainage member used in connection therewith. Furthermore, the word "spiral" is used in its popular sense and refers to a winding, similar to a screw thread.

The modified form of drum illustrated in Figure 5 is provided with a single rib or flange 50 at each end of the drum and against which the spiral wire drainage members and the axially extending partitions 46 abut.

A further modified form of filtered drum is illustrated in Figure 6, and in this particular type we form the drum itself with a smooth cylindrical surface and provide the spiral wire drainage member 45 with axially extending partitions 46 and circumferentially extending strips 51 at the edges of the spiral wire drainage member, which partitions and strips are formed in the same manner as the axially extending partitions 46', the details of which are more clearly illustrated in Figures 2 and 3 of the drawings. The fact that each compartment is subjected to a high vacuum and at no time subjected to the action of compressed air, prevents any danger or likelihood of the filter cloth or drainage member sagging outwardly, and also insures that a proper seal will be maintained between each compartment and between the compartments and the external air. The spiral wire which forms the drainage member may be readily procured in the open market, and, varying in size as well as in mesh, provides for a considerable range of depth for each compartment, depending upon the liquid or filtrate to be handled.

Having thus described our invention, we claim and desire to secure by Letters Patent:

1. A rotary filter comprising a drum having a plurality of filtering compartments and an outlet pipe communicating with each compartment and with a common manifold in which a low pressure is adapted to be maintained, and a two-way cock located in each outlet pipe and adapted to bring the compartments into communication with the common manifold, and into communication with the atmosphere, and means for operating said cocks.

2. A rotary drum filter having filtering compartments, outlet pipes communicating with each compartment, a two-way cock carried by each outlet pipe, a manifold or receiver communicating with said two-way cocks, said two-way cocks adapted to bring said compartment into communication with said manifold and into communication with the atmosphere, and adjustable means for controlling the position of the cocks as the drum filter is rotated.

3. An apparatus of the class described including a rotary drum having a plurality of filtering compartments thereon, outlet pipes communicating with each compartment, a receiver or manifold communicating with said outlet pipes, a two-way cock located in each outlet pipe and adapted to bring the compartments into communication with the said receiver and to bring the compartments into communication with the atmosphere, adjustably mounted stationary cams located in the path of travel of said cocks and adapted to operate the same, to control the position thereof as the said drum and cocks are rotated.

4. A rotary drum filter having a plurality of compartments on the drum, a receiver or manifold carried by said drum, outlet pipes communicating with each compartment and with the said manifold, a two-way cock located within said pipes adapted to bring the compartments into communication with said manifold and to close the compartments to the manifold and open them to the atmosphere, handles carried by said cocks, and adjustable stationary members positioned in the path of travel of said handles and adapted to control the position of said cocks during the rotation of said filter drum.

5. A rotary drum filter including a plurality of filtering compartments, a hollow shaft supporting the filter drum, outlet pipes communicating with each compartment and with the hollow shaft, valves located in each pipe and adapted to bring said compartments into communication with said hollow shaft and to close said compartments to said hollow shaft and to bring them into communication with the atmosphere, and adjustable means arranged in the path of travel of said valves and adapted to control the position thereof as the valves and compartments are revolved.

6. A filtration apparatus comprising a rotary drum having filtering compartments thereon, a receiver, outlet pipes communicating with said compartments and with said receiver, valves located in said outlet pipes, means for opening and closing said valves as said drum is rotated, a second receiver, a second set of outlet pipes communicating with said second receiver and with the said compartments, and valves located in said second set of outlet pipes adapted to bring said compartments into communication with said second receiver, into communication with the atmosphere, and to close said second outlet pipes to both the second receiver and the atmosphere, and means for operating said valves in the second set of outlet pipes as said drum is rotated.

7. A filtration apparatus including a rotary drum having filtering compartments thereon, a receiver or manifold, outlet pipes communicating with each compartment and with said manifold, cocks located in said outlet pipes, a second receiver or manifold, a second set of outlet pipes communicating with said second manifold and with said compartments, two-way cocks located in said second set of outlet pipes adapted to bring said compartments into communication with said second receiver, adapted to bring said compartments into communication with the atmosphere, and adapted to close said compartments to both the second receiver and the atmosphere, and means for controlling the position of said cocks of the outlet pipes.

8. A filtration apparatus including a rotary drum having filtering compartments thereon, a receiver or manifold, outlet pipes communicating with each compartment and with said manifold, cocks located in said outlet pipes, a second receiver or manifold, a second set of outlet pipes communicating with said second manifold and with said compartments, two-way cocks located in said second set of outlet pipes adapted to bring said compartments into communication with said second receiver, adapted to bring said compartments into communication with the atmosphere, and adapted to close said compartments to both the second receiver and the atmosphere, and adjustable means located in the path of travel of said cocks and adapted to control the position thereof as the cocks are revolved with the rotation of the drum.

9. A filtration apparatus comprising a rotary drum having compartments thereon, two sets of outlet pipes communicating with each compartment, and means carried by said outlet pipes adapted to expose the interior of the compartments to a vacuum during the time the compartment is immersed in the liquid to be filtered, to a second and more intense vacuum when the compartment is located above the liquid for the drying of the cake, and to the atmosphere to allow for the stripping of the cake from the filtering medium of the compartment.

10. A filtration apparatus comprising a rotary drum having compartments thereon, two sets of outlet pipes communicating with each compartment, and means carried by said outlet pipe adapted to expose the interior of the compartments to a source of low pressure during the initial immersion of the compartment in a liquid, to a second source of low pressure during the remaining portion of the time the compartment is immersed in the liquid, so as to thus separate the initial and final filtrates and to expose the interior of the compartment to atmospheric pressure to allow for the stripping of the cake.

11. An apparatus of the class described including a drum, a spiral wire drainage member located upon said drum, and partition members extending longitudinally of said drum and dividing the same into compartments, and a filter medium contacting with said partition members and held away from said drum by said spiral wire drainage member.

12. An apparatus of the class described comprising a drum, a drainage member formed of intertwined, looped wire located upon said drum, partition members upon said drum, a filter medium cooperating with said partition members and said drainage member and forming a plurality of filtering compartments.

13. A drainage member for filtering compartments comprising wire woven into spiral intertwined formation, adapted to hold the filtering cloth away from the drum of the filter and provide for the drainage of the filtered liquid therethrough.

14. A drainage and compartment forming member for the drum of rotary filters comprising wire woven into loop or spiral formation and intertwined with adjacent spirals or loops and adapted to encompass the drum, said looped or spiral wire provided with partition members.

15. A drainage or compartment forming member for the drum of rotary filters comprising connected spiral or looped wire members, the same being adapted to encompass the drum, longitudinally extending partition members embedding the loops or spirals of said wire therein, and transversely disposed members extending along the edges of the spiraled wire and joining the longitudinal members, said longitudinal and transverse members adapted to contact with the surface of the drum and, in conjunction with the filter cloth and the spiral wire and the surface of the drum, to form filtering compartments.

16. A drainage member for filters comprising wire bent into looped or spiral formation and intertwined with the loops or spirals of adjacent wire and thereby forming a wire structure characterized by transversely and longitudinally extending ducts.

Signed at New York, borough of Manhattan, in the county of New York and State of New York this 14th day of November, A. D. 1921.

ARTHUR WRIGHT.

with the filter cloth and the spiral wire and the surface of the drum, to form filtering compartments.

16. A drainage member for filters comprising wire bent into looped or spiral formation and intertwined with the loops or spirals of adjacent wire and thereby forming a wire structure characterized by transversely and longitudinally extending ducts.

Signed at New York, borough of Manhattan, in the county of New York and State of New York this 14th day of November, A. D. 1921.

ARTHUR WRIGHT.

CERTIFICATE OF CORRECTION.

Patent No. 1,590,401.  Granted June 29, 1926, to

ARTHUR WRIGHT and FRANK W. YOUNG.

It is hereby certified that the signature of the second mentioned patentee in the above numbered patent, "Frank W. Young", should appear at the end of the specification, under the signature of Arthur Wright; and that the said Letters Patent should be read with this correction therein that the same may conform to the record of the case in the Patent Office.

Signed and sealed this 7th day of July, A. D. 1931.

(Seal)

M. J. Moore,
Acting Commissioner of Patents.

CERTIFICATE OF CORRECTION.

Patent No. 1,590,401.             Granted June 29, 1926, to

ARTHUR WRIGHT and FRANK W. YOUNG.

It is hereby certified that the signature of the second mentioned patentee in the above numbered patent, "Frank W. Young", should appear at the end of the specification, under the signature of Arthur Wright; and that the said Letters Patent should be read with this correction therein that the same may conform to the record of the case in the Patent Office.

Signed and sealed this 7th day of July, A. D. 1931.

(Seal)
                     M. J. Moore,
                     Acting Commissioner of Patents.